United States Patent [19]
Chiang et al.

[11] Patent Number: 5,734,586
[45] Date of Patent: Mar. 31, 1998

[54] SYSTEM FOR ACHIEVING OPTIMAL STEADY STATE IN POWER DISTRIBUTION NETWORKS

[75] Inventors: Hsiao-Dong Chiang, Ithaca, N.Y.; Jin-Cheng Wang, Sunnyvale, Calif.

[73] Assignee: Cornell Research Foundation, Inc., Ithaca, N.Y.

[21] Appl. No.: 436,036

[22] Filed: May 5, 1995

[51] Int. Cl.$^6$ .................... H02J 3/14; H02J 3/16; H02J 3/12; G05B 13/04
[52] U.S. Cl. .................... 364/492; 307/31; 307/35; 307/38; 307/39; 340/825.06; 364/148; 364/493
[58] Field of Search .................... 307/31, 35, 38, 307/39; 323/209; 340/825.06; 364/148, 492, 493, 494

[56] References Cited

U.S. PATENT DOCUMENTS

| | | | |
|---|---|---|---|
| 2,976,480 | 3/1961 | Johnson | 323/209 |
| 3,002,146 | 9/1961 | Lorrig et al. | 323/209 |
| 3,002,147 | 9/1961 | Wasserman | 323/209 |
| 3,063,003 | 11/1962 | Pirhofer | 323/209 |
| 4,264,960 | 4/1981 | Gurr | 364/492 |
| 4,769,587 | 9/1988 | Pettigrew | 323/209 |
| 5,420,495 | 5/1995 | Hingorani | 323/318 |
| 5,422,561 | 6/1995 | Williams et al. | 323/209 |
| 5,517,423 | 5/1996 | Pamatto | 364/492 |
| 5,608,646 | 3/1997 | Pomatto | 364/492 |
| 5,610,834 | 3/1997 | Schlueter | 364/492 |

OTHER PUBLICATIONS

Baldick, R., & F. F. Wu 1990. "Efficient Integer Optimization Algorithms for Optimal Coordination of Capacitors and Regulators". *IEEE Trans. On Power Systems*, vol. 5., No. 3, Aug.:805–812.

Baran, M. E., & F. F. Wu. 1993. "Network Reconfiguration in Distribution Systems for Loss Reduction and Load Balancing". *IEEE Trans. On Power Delivery*. vol. 4, No. 2, Apr.:1401–1407.

Baran, M. E. And F. F. Wu. 1989. "Optimal Capacitor Placement on Radial Distribution Systems". *IEEE Trans. On Power Delivery*. vol. 4, No. 1, Jan.:725–734.

Bishop, M. T. & Lee, R. E. 1986. "Distribution System Line Loss Reduction Through Enhanced Capacitor Location Techniques". *IEEE Trans. on Power Delivery*. vol. 1, No. 2, Apr.:190–197.

Broadwater, R. P., Kahn, A. H., Shaalan, H. E., & Lee, R. E. 1993. "Time Varying Load Analysis To Reduce Distribution Losses Through Reconfiguration". *IEEE Trans. On Power Delivery*. vol. 8, No. 1, Jan.:249–300.

Chen, T. H., M. S. Chen, K. J. Hwang, P. Kotas & E. A. Chebli. 1991 "Distribution System Power Flow Analysis—A Rigid Approach". *IEEE Trans. on Power Delivery*. vol. 6, No. 3, Jul.:1146–1152.

C. S. Chen & Cho, M. Y. 1993 "Energy Loss Reduction by Critical Switches". *IEEE Trans. On Power Delivery*. vol. 8, No. 3, Jul.:1246–1253.

(List continued on next page.)

*Primary Examiner*—Edward R. Cosimano
*Attorney, Agent, or Firm*—Salzman & Levy

[57] ABSTRACT

The present invention features a direct, closed-loop method for controlling an unbalanced, power-distribution network having a great number of nodes, branches and laterals, as well as multiphase loads. The network has a radial structure. One or more formulae are first derived for a power-distribution network. The formulae may be an explicit loss formula, a voltage formula, a line flow formula or any combination thereof. Network flow programming techniques which incorporate the formulae are then developed to directly achieve steady state. Finally, the control steps are performed on the power-distribution network in real time to control its operation. The control steps may include placing a capacitor, regulator or switch at a specific position in the network and/or reconfiguring the network in some other manner.

18 Claims, 4 Drawing Sheets

OTHER PUBLICATIONS

Hsiao–Dong Chiang, Jin–Chen Wang, O. Cockings & H. D. Shin. 1990. "Optimal Capacitor Placements in Distribution Systems: Part I: A New Formulation and Overall Problem". *IEEE Trans. on Power Delivery.* vol. 5, No. 2, Apr.:634–642.

S. Civanlar, J. J. Granger. 1985. "Volt/Var Control on Distribution Systems with Lateral Branches Using Shunt Capacitors and Voltage Regulators: Part I, Part II, Part III". *IEEE Trans. On Power Apparatus and Systems.* vol. 104, Nov.:3278–3297.

A. A. El–Kib, J. J. Grainger, K. N. Clinard, L. J. Gale. 1985. "Placement of Fixed and/or Non–Simultaneously Switched Capacitors on Unbalanced Three–Phase Feeders Involving Laterals". *IEEE Trans. On Power Apparatus and Systems.* vol. 104, Nov.:3298–3305.

S. K. Goswami, & S. K. Basu. 1992 "A New Alogoritm for the Reconfiguration of Distribution Feeders For Loss Minimization". *IEEE Trans. On Power Delivery.* vol. 7, No. 3, Jul.:1484–1491.

J. J. Grainger, & S. H. Lee. 1982. "Capacitor Release by Shunt Capacitor Placement on Distribution Feeders: A New Voltage–Dependent Model". *IEEE Trans. On Power Apparatus and Systems.* vol. 101, May:1236–1244.

J. J. Grainger, S. H. Lee, A. A. El–Kib. 1982. "Design of A Real–time Switching Control Scheme for Capacitive Compensation of Distribution Feeders". *IEEE Trans. On Power Apparatus and Systems.* vol. 101, Aug.:2420–2428.

K. H. Jung, H. Kim, Y. Ko. 1993 "Network Reconfiguration Algorithm for Automated Distribution Systems Based on Artificial Intelligence Approach". *IEEE Trans. On Power Delivery.* vol. 8, No. 4, Oct.:1933–1941.

H, C. Kuo & Y. Y. Hsu. 1993 "Distribution System Load Estimation and Service Restoration Using a Fuzzy Set Approach". *IEEE Trans. On Power Delivery.* vol. 8, No. 4, Oct.:1950–1957.

R. E. Lee & C. L. Brooks. 1988 "A Method and its Application to Evaluate Automated Distribution Control". *IEEE Trans. On Power Delivery.* vol. 3, No. 3, Jul.:1232–1240.

S. H. Lee & J. J. Grainger. 1981 "Optimum Placement of Fixed and Switched Capacitors on Primary Distribution Feeders". *IEEE Trans. On Power Apparatus and Systems.* vol. 100, Mar.:45–352.

G. X. Luo & A. Semlyen. 1990. "Efficient Load Flow for Large Weakly Meshed Networks". *IEEE Trans. On Power Systems.* vol. 5, No. 4, Nov.:1309–1316.

J. Qiu & S. M. Shahidehpour. 1987. "A New Approach For Minimizing Power Losses and Improving Voltage Profile". *IEEE Trans. on Power Systems.* vol. PWRS–2, No. 2, May:287–295.

D. W. Ross, J. Patton, A. I. Cohen and M. Carson. 1981. "New Methods for Evaluating Distribution Automation and Control (DAC) Systems Benefits". *IEEE Trans. On Power Apparatus and Systems.* vol. 100, No. 6, Jun.:2978–2986.

M. M. A. Salama, E. A. A. Mansour, A. Y. Chikhani and R. Hackam. 1985. "Control of Reactive Power in Distribution Systems with an End–Load and Varying Load Condition". *IEEE Trans. on Power Apparatus and Systems.* vol. 104, pp. 941–947.

D. Shirmohammadi, H. W. Hong, A. Semlyen and G. X. Luo. 1988. "A Compensation–based Power Flow Method for Weakly Meshed Distribution and Transmission Networks". *IEEE Trans. On Power Systems.* vol. 3, No. 2, May:753–762.

D. Shirmohammadi, H. W. Hong. 1989. "Reconfiguration of Electric Distribution Networks for Resistive Line Losses Reduction". *IEEE Trans. on Power Deliver.* vol. 41, No. 2, Apr.:1492–1498.

T. Taylor & D. Lubkeman. 1990. "Implementation of Heuristic Search Strategies for Distribution Feeder Reconfiguration". *IEEE Trans. On Power Delivery.* vol. 5, No. 1, Jan.:239–246.

Jin–Cheng Wang, Hsiao–Dong Chiang, Gary Darling. "Optimal Capacitor Placement and Real Time Control in Large–Scale Unbalanced Distribution Systems: Numerical Studies". *Submitted to 95 IEEE Winter Power Meeting, New York.*

Chen et al;, "Determination of Critical Switches in Distribution System"; *IEEE Transactions on Power Delivery*; vol. 7 No. 3, Jul. 1992; pp. 1443–1449.

SYSTEM FOR ACHIEVING OPTIMAL STEADY STATE IN POWER DISTRIBUTION NETWORKS

FIELD OF INVENTION

The present invention pertains to large-scale, unbalanced, power-distribution networks and, more particularly, to a system for achieving optimal, steady state by the use of a loss formula, a voltage formula and a line-flow formula therefor.

BACKGROUND OF THE INVENTION

An electrical, power-distribution network is considered unbalanced if it has unequal loads, regardless of whether the system is one-phase, two-phase or even three-phase. In order to find a steady state in an unbalanced network, hundreds or even thousands of non-linear equations must usually be solved. This, of course, presents a complex, time-consuming problem. Unfortunately, when attempting to control such an unbalanced network online, unlimited time is the one resource that is not available.

As a practical matter, the conventional approach to this problem has been to consider an initial case or approximation and use a Gaussian or Newtonian iterative technique to provide a solution. The underlying assumption is that successive iterations will converge, which is not always the case. Regardless of whether convergence occurs, however, iterative techniques (especially those for complex systems, such as a plurality of non-linear equations) are extraordinarily computation-intensive and, therefore, time-consuming. In many cases, such as in online, so-called "real-time" control environments, or when power restoration is needed, the time necessary for solution is simply unacceptable.

It would be advantageous to provide a system for finding a steady state of an unbalanced, power-distribution network in a direct, closed-form manner.

It would also be advantageous to apply such a direct, closed-form system to a power-distribution network on an online, real-time, control basis.

It would be further advantageous to apply such a direct, closed-form system to a power-distribution network in order to obtain effective control thereof without the need for performing computer simulations.

It would be still further advantageous to apply such a direct, closed-form system to a power-distribution network as part of a power-restoration technique.

SUMMARY

In accordance with the present invention, a direct, closed-form system is used to develop the fundamental loss, voltage and line-flow formulae for large-scale, unbalanced distribution systems. Also disclosed is an explicit formula for determining the variations in system losses, three-phase line flows and voltages, in terms of system and network data, with respect to variations in control devices, network components and connections. Applications of the explicit expression to real-time control of distribution systems are identified. The three-phase power flow and loss formulae are capable of coping with a great number of nodes, branches and laterals; multiphase, grounded or ungrounded loads; cogenerators, multiphase shunt elements and transformers of any connections in general, large-scale, unbalanced distribution systems.

Also disclosed is a direct, closed-loop method for controlling an unbalanced, power-distribution network having a great number of nodes, branches and laterals, as well as multiphase loads. The network has a radial structure. First, one or more formulae are derived for a power-distribution network. The formulae may be an explicit loss formula, a voltage formula, a line-flow formula or any combination thereof. Network-flow programming techniques, incorporating the formulae, are then developed to directly achieve steady state. Finally, the control steps are performed on the power-distribution network in real time to control its operation. The control steps may include placing a capacitor, regulator or switch at a specific position in the network and/or reconfiguring the network in some other manner.

The loss, voltage and line-flow formulae developed for large-scale, unbalanced distribution systems can be applied to many applications in real-time analysis and control to cope with:

a great number of nodes/branches/laterals;

radial network structure;

multiphase, grounded or ungrounded loads;

cogenerators;

multiphase shunt elements; and transformers of any connections.

The explicit formulae provide for:

a) explicit computation without requiring initialization of the system's states;

b) efficient determination of system losses and power-flow solutions for any large variations in system topology, data and model uncertainties;

c) detailed modeling of all system components, including cogenerators, shunt elements, transformers, line-charging and multiphase, grounded or ungrounded loads;

d) efficient solutions to large-scale, unbalanced networks by incorporating network-flow programming techniques;

e) accurate, explicit computing and updating of either full or partial system's states in terms of system and network data for an initial configuration or varying system configurations; and f) direct derivation of efficient, real-time control schemes for capacitors, regulators and switches.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
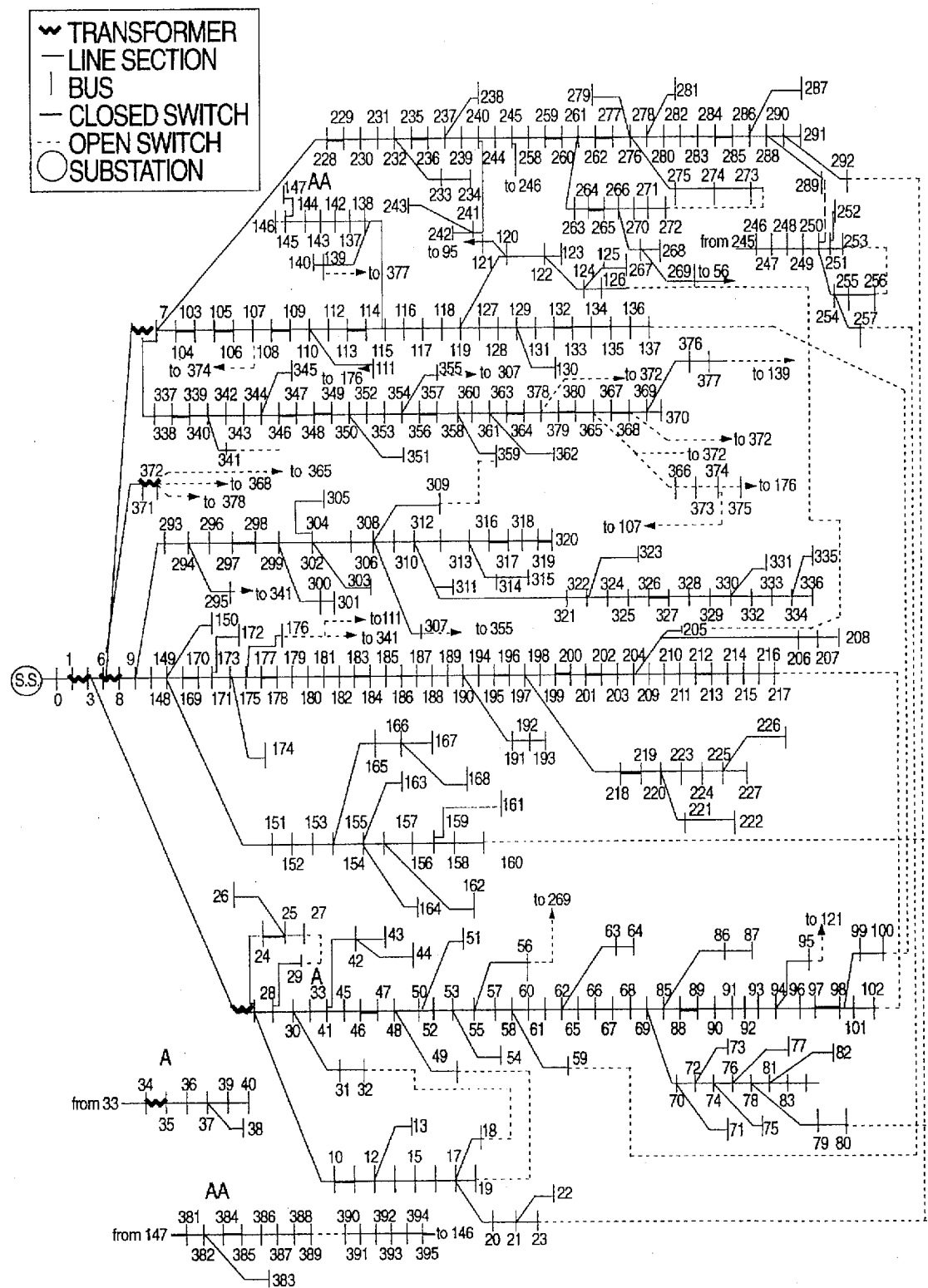
FIG. 1 is a schematic representation of a 394-bus, unbalanced, power-distribution system.

For purposes of this description, let N be the set of nodes in a distribution system, such as is shown in FIG. 1. The path from node k in N to a distribution substation is denoted by $P_k$. $P_{j,k}$ stands for the common path between a pair of nodes j and k. $L_k$ is defined as the set of nodes in $P_k$, and $L_{j,k}$ represents the set of common nodes in $P_k$ and $P_j$, i.e., $L_j \cap L_k$. $C_k = \{l | l \in L_1\}$ is the set of children nodes emanating from node k.

Let k be a node index and $I_k$ stand for the line flow into node k toward the children nodes of k. Let $C_k$ be the union of k and the collection of children nodes emanating therefrom. Let $N_k$ be a set of line segments connecting the nodes in set $C_k$.

The load representation of two, typical load models are described herein: the ZIP model where loads are modeled as a combination of constant impedance, constant current and constant power; and the exponential load model. All other, multiphase, grounded or ungrounded loads expressed in the form of either ZIP loads or exponential loads can be treated in this framework.

For load bus k, modeled as a three-phase, exponential model, the real and reactive loads are $G^a_k(V^a_k)^\alpha$ and $B^a_k(V^a_k)^\beta$. The two models are considered representative of general, static loads since nonlinear loads can also be approximated by ZIP loads, using the principle of Taylor expansion, i.e., any nonlinear function of voltage can be approximated by its expansion of the first three dominant terms.

To develop explicit, line-flow formulae, the usual relationship between line flow at a line section and voltages at the primary and secondary nodes of the line section will be used:

$$\begin{bmatrix} I^p \\ I^s \end{bmatrix} = \begin{bmatrix} Y_{pp} & Y_{ps} \\ Y_{sp} & Y_{ss} \end{bmatrix} \begin{bmatrix} v_p \\ v_s \end{bmatrix}$$

In this formula, the expressions of $Y_{pp}$, $Y_{ps}$, $Y_{sp}$ and $Y_{ss}$ depend on the types of transformer connections [7]. For ordinary line sections with line charging, $Y_{pp}=Y_{ss}=Z^{-1}+Y/2$ and $Y_{ps}=Y_{sp}=Z^{-1}$.

A framework is now developed for relating the line flow at the primary side to that at the secondary side of a line section. In general, the relationship given is:

$$I^p = S_p I^s + s^p = S_p I^s$$

If a segment contains a transformer or has line charging, $S_p = Y_{ps} Y^+_{ss}$ and $s^p = (Y_{pp} - Y_{ps} Y^+_{ss} Y_{sp})^v p$. $Y^+_{ss}$ is the pseudo inverse of $Y_{ss}$, satisfying $Y^+_{ss} Y_{ss} Y^+_{ss} = Y^+_{ss}$ and $Y_{ss} Y^+_{ss} Y_{ss} = Y_{ss}$. If a segment contains no transformer or has no line charging, $S_p = I_{3 \times 3}$ and $s_p = 0$.

In this setting, the transformer off-norminal tap setting and voltage regulators are all modeled and incorporated into the same general framework for three-phase load flow. Due to the nature of these matrices, $s_p$ can be neglected in the subsequent loss calculations.

The loss formula will be expressed in terms of the line current flows and subsequently in terms of system data, network data and load data. The line flow vector at either the primary or the secondary side of the segment connected to node k will be explicitly expressed. To account for the effect of line charging and transformers in the network, an important transformation matrix is introduced. With the availability of the transformation $H_{k,l}$, the net contribution of load current at bus l, as a child node of k on the line flow $I_k$, can be derived by using $H_{k,l} J_l$, with $H_{k,l} = S_k \ldots S_l$, $S_i, i=k, \ldots l$ are defined as before. The line flow at the primary side is a summation of the total contributions from the children nodes of k:

$$I_k^p = \sum_{l \in C_k} H_{k,l} J_l \quad (1.1)$$

To derive the line flow at the secondary side, the same expression will be used as above, except that $S_k$ in the transformation matrix $H_{k,l}$ will be replaced by an identity matrix, yielding a new matrix, $T_{k,l}$:

$$I_k^s = \sum_{l \in C_k} T_{k,l} J_l \quad (1.2)$$

Since the line flow at the secondary side will appear in the loss representation, the superscript s will be omitted hereinafter.

In the above formula, the load current at bus l, $J_l$ is expressed for ZIP load models as follows:

$$J_l = \begin{bmatrix} c_{l1} G_l^a v_l^a + c_{l2} J_l^a + c_{l3} \dfrac{P_l^a}{(v_l^a)^*} \\ c_{l1} G_l^b v_l^b + c_{l2} J_l^b \angle -\dfrac{2\pi}{3} + c_{l3} \dfrac{P_l^b}{(v_l^b)^*} \\ c_{l1} G_l^c v_l^c + c_{l2} J_l^c \angle -\dfrac{2\pi}{3} + c_{l3} \dfrac{P_l^c}{(v_l^c)^*} \end{bmatrix} -$$

$$j \begin{bmatrix} c_{l1} B_l^a v_l^a + c_{l2} K_l^a + c_{l3} \dfrac{Q_l^a}{(v_l^a)^*} \\ c_{l1} B_l^b v_l^b + c_{l2} K_l^b \angle -\dfrac{2\pi}{3} + c_{l3} \dfrac{Q_l^b}{(v_l^b)^*} \\ c_{l1} B_l^c v_l^c + c_{l2} K_l^c \angle -\dfrac{2\pi}{3} + c_{l3} \dfrac{Q_l^c}{(v_l^c)^*} \end{bmatrix}$$

Here, $v^a_l$, $v^b_l$ and $v^c_l$ are voltages at the l-th bus and at phases a, b and c. If any phase of the load bus l does not exist, the corresponding elements of $J_l$ contain zero entries.

The explicit expression of line flow makes it possible to determine the current flow along one particular line or to partially, rather than completely, compute the line flow of a system. This feature of line flow can be used particularly in real-time distribution system monitoring and control, where only a few system's states are often sufficient. The capability of the partial determination of a system's states based on the explicit expression differs essentially from the usual, three-phase, distribution power-flow, because a complete system's states must be determined in a three-phase, power-flow program. Similar comments apply to the explicit expression for real power loss and voltages.

Figure 3:
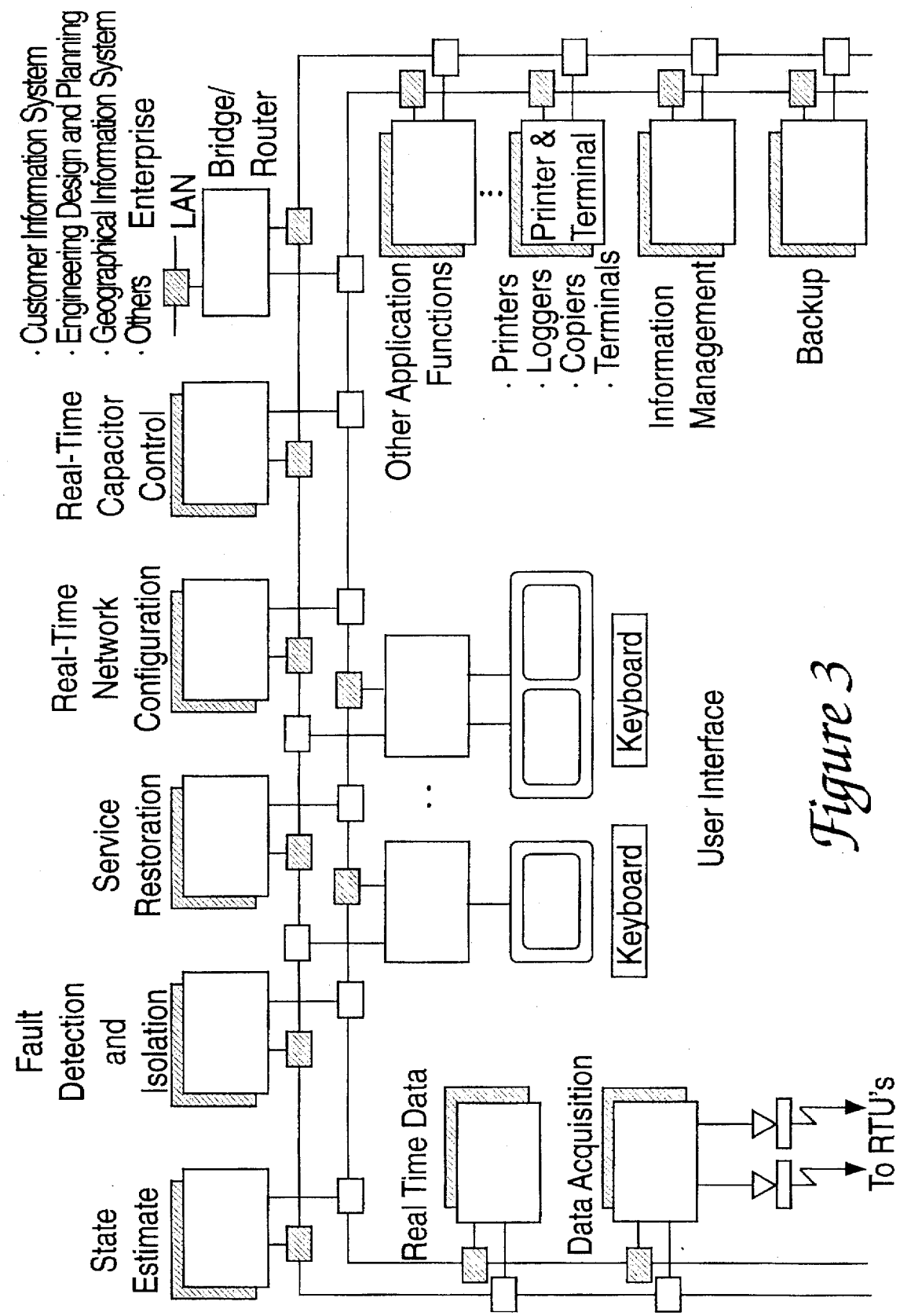
FIG. 3 is a schematic representation of a distribution control center which performs various, real-time, distribution automation functions, in accordance with the invention.

The expression for line flow can be used to cope with network changes, such as load growth and system expansion in power-flow calculations (see FIG. 3, for example). In the context of real-time applications, even though a portion of load data or their estimated values are not in the database, one can perform line-flow computation by using the rest of the available data. Indeed, when load and network data are only partially given as program inputs, the line flow within a small area of the distribution network can be determined, and/or the current rows may be expressed in terms of symbolic variables of the load data, in order to perform symbolic computation of the line current flow. In this setting, full load data are not really required to compute some line flow.

One outstanding issue is how to perform accurate loss computation at the line segments containing line charging or transformers. In this regard, accurate loss models are developed to perform loss computation at any line segment.

The mathematical expressions of line flow enables the development of a loss formula in terms of load and network data. The total loss in a distribution system is a summation of losses at all of the segments in the entire network. The basic, real power loss of a distribution system is denoted as $P_{LO}$. Then, beginning with a standard formula $P_{Lo}=\Sigma k\epsilon N/N_t I^*_k R_k I_k + \Sigma m\epsilon N_t [(I^P_m)^* v^P_m + (I^s_m)^* v^s_m]$ gives us the following, explicit formula:

$$P_{LO} = \sum_{k \in N/N_t} I_k^* R_k I_k + \sum_{m \in N_t} (I_m^s)^* R_m I_m^2 \quad (1.3)$$

$$= \sum_{k \in N} \left\{ \sum_{l \in C_k} T_{k,l} J_l \right\} * R_k \left\{ \sum_{l \in C_k} T_{k,l} J_l \right\}$$

where $N_t$ is the set of line segments containing transformers or line charging. It is important to introduce the equivalent impedance $Z_m$ in the real power loss computation. This will greatly simplify computation, while preserving computational accuracy. In the loss formula, $R_m$ is the real part of an equivalent impedance formed by:

$$Z_m = S_p^* Z_{pp} S_p + Z_{ss} + S_p^* Z_{ps} + Z_{sp} S_p \cdot \begin{bmatrix} Z_{pp} & Z_{ps} \\ Z_{sp} & Z_{ss} \end{bmatrix} = \begin{bmatrix} Y_{pp} & Y_{ps} \\ Y_{sp} & Y_{ss} \end{bmatrix}^+$$

This expression provides a basis for which transformer losses can be evaluated. For an ordinary line segment, from k to its preceding node without line charging, $R_k$ takes on the form:

$$R_k = \begin{bmatrix} r_k^{aa} & r_k^{ab} & r_k^{ac} \\ r_k^{ba} & r_k^{bb} & r_k^{bc} \\ r_k^{ca} & r_k^{cb} & r_k^{cc} \end{bmatrix}$$

If any phase of the line section does not exist, the corresponding row and column in this matrix contain all zero entries.

Let the three-phase voltage at the substation $v_o$ be given. The voltage vector at node k is computed via the available line flow along the line segments lying in the path from k to the substation. Thus, for any line section, the voltage vector at the secondary bus is related to that at the primary side via $$v^s = v^p - Z_k I^s \quad (1.4)$$

Thus, for transformer sections or sections with line charging, the voltage vector at the secondary bus is given by:

$$v^s = \begin{bmatrix} Y_{ps} \\ Y_{ss} \end{bmatrix}^+ \left( \begin{bmatrix} I^p \\ I^s \end{bmatrix} - \begin{bmatrix} Y_{pp} \\ Y_{sp} \end{bmatrix} v^p \right)$$

$$= S_p^* v^p - Z_k I^s$$

In general, the voltage vector at bus K is derived from the slack bus O by:

$$v_k^i = T^*_{0,k} v_0^i - \sum_{l \in L_k} T^*_{l,k} Z_l \sum_{m \in N_l} T_{l,m} J_m \quad (1.5)$$

One advantage of both the loss model and the three-phase, power-flow formula is the capability for accurately updating power losses and states of a distribution system for ever-changing network topology and data without a recourse to repetitive, full power flow. Another advantage of the loss formula stems from the explicit representation of the power and energy loss in terms of load and network data. This loss model differs from the sensitivity-based loss formula in that the latter cannot evaluate loss and power flow for any large variations in system data or in the control device settings. The loss formula can thus be used to identify many possible, real-time applications in both analysis and control of distribution systems. These formulae are suitable for several applications in distribution automation (e.g., a direct application of the loss formula would be the capacitor placement and control problems, as well as the network reconfiguration problems, in distribution systems).

After the line flow, loss and voltage formulae are established for the base loads at the time during which loads remain constant, appropriate formulae must be derived under simultaneous load variations. This provides a basis for determining the effect of load variations on line flow, losses and voltages.

Let the prior notation for load demands stand for those at the base case. Load variation in bus l are taken into account by multiplying a factor $T^i_l$ with the normal load demand at bus l. Then, the expression for line flow into node k is similar to the previous, corresponding one, except that it is modified by some load variation factors. At load level i, the line flow toward k$\epsilon$N is similar to the base case, except that the load currents are modified as $J^i_l = T^i_l J_l$. One common consideration in the literature of load variation is the uniform load variation, with a variation factor $T_i$ for the i-th load level. In this special case, $J^i_k = T^i J_k$.

The power loss at load level i is $P^i_{Loss}$ and has a similar expression to that of the base case. The energy loss during the time $\Sigma^L_{i=1} T_i$ is a summation of energy losses over the L time periods, $E_{Loss} = \Sigma^L_{i=1} T^i P^i_{Loss}$.

If transformers are in the presence of the path from k to the substation, the voltage magnitudes at node k and load level i can be calculated analogous to that mentioned hereinabove. The voltage at bus k can be updated to:

$$v_k^i = T^*_{0,k} v_0^i - \sum_{l \in L_k} T^*_{l,k} Z_l \sum_{m \in N_l} \tau_m^i T_{l,m} J_m, \quad (1.6)$$

where $v^i_k$ is the voltage at bus k and load level i.

The present invention features an efficient method for three-phase power flow and loss computation, based on a novel scheme using backward and forward sweeps with the aid of network flow pointers. Specifically, a backward sweep of line flow and a forward sweep of voltages are described herewith. The computation is achieved efficiently by network flow programming as a basic data structure. Three network flow pointers sufficiently determine network connectivity: the ordering of nodes o(.), the preceding node array p(.) to o(.) and an array for the degrees of nodes d(.). The degree of each node corresponds to its distance to the substation.

The loss formula can be applied to efficiently determine a capacitor control setting. The total real power or energy loss of a distribution system can be expressed as a function of network data and the capacitor control setting in the following form: $-u^T A u + 2bu$, where u is the capacitor control setting. Both A and b can be derived from system and network data. Therefore, system loss variation as a result of shunt capacitor placement and control can be computed for a given u, with A and b specified by the line and load data. On the contrary, real-time control schemes can be developed, based upon the quadratic loss model, by finding u to minimize either power or energy losses.

One direct application is the sensitivity computation. The developed formulae made it possible to express the sensitivities of current flow, loss and voltage and to apply them to the variations in the network components in terms of system and network data.

Table I describes real and reactive system losses for different systems. The result from the loss model matches well with that from a standard, comprehensive, three-phase load flow. In all test systems performed by the inventors, transformer, line and total system losses are close to those computed by a standard load flow.

TABLE I

A comparison of the total, real power loss from both a loss formula and a standard, three-phase, power flow method

| Systems | Three Phase power flow | Loss Formula | Error % |
|---|---|---|---|
| 101 | 102.491 | 101.569 | −0.900 |
| 151 | 234.073 | 235.842 | 0.756 |
| 191 | 256.703 | 258.862 | 0.841 |
| 231 | 339.362 | 343.520 | 1.225 |
| 291 | 400.499 | 406.655 | 1.537 |
| 394 | 579.708 | 554.722 | −4.310 |

The three-phase power flow and loss formula under load variations for a real, 291-bus distribution system (similar to that shown in FIG. 1) are herein evaluated. For the sake of demonstration, it is assumed that all loads are varying in a uniform manner; i.e., all grounded or ungrounded loads are multiplied uniformly by a factor ranging from 0.5 to 1.5 in a step size of 0.05. The plots for real and reactive transformer losses, line losses and total system losses versus the load variation factors are drawn to show how losses change with large load variations. The results obtained by the three-phase power flow and the loss formula are closely compared with those from an exact power flow and loss computation. Table II describes actual implementation results for the 291-bus system.

TABLE II

A comparison of the total real power loss from both a loss formula and a standard, three-phase power flow method

| Load Factor | Three Phase Power Flow | Loss Formula | Error % |
|---|---|---|---|
| 0.5 | 133.668 | 133.206 | −0.346 |
| 0.7 | 245.124 | 246.703 | 0.644 |
| 0.9 | 390.624 | 396.546 | 1.516 |
| 1.1 | 565.692 | 579.793 | 2.493 |
| 1.3 | 766.205 | 794.101 | 3.641 |
| 1.5 | 988.395 | 1037.725 | 4.991 |

The loss formula is also evaluated with respect to large variations in the capacitor control setting and/or network topology. For efficient updating of a significant number of network or control switching in real simulation studies, only loss changes are computed; thus, the overall losses can be determined for various system configurations. Therefore, the basic invariant portion is not repeatedly computed. This portion of study is performed on a real, 394-bus system. The total system losses varying with system configurations have been effectively evaluated by the quadratic loss model, where, in particular, the loss against the capacitor control setting at any arbitrary bus can be determined. Table III shows the total system losses with respect to the capacitor control setting at four locations. Losses corresponding to these kinds of variations in system configurations are also obtained by using a standard, three-phase, power flow. No substantial discrepancy between the results computed by the loss formula and the standard power flow method is observed. Finally, losses with respect to network on/off switching are also evaluated, but not shown for brevity.

TABLE III

A comparison of the total real power loss from both a loss formula and a standard, three-phase, power flow method

| Capacitor Sizes | Three Phase Power Flow | Loss Formula | Error % |
|---|---|---|---|
| 0 | 497.042 | 506.040 | 1.810 |
| 300 | 466.761 | 473.829 | 1.514 |
| 600 | 460.227 | 471.991 | 2.556 |
| 900 | 480.708 | 500.526 | 4.123 |
| 1200 | 531.911 | 559.435 | 5.175 |
| 1500 | 618.043 | 648.716 | 4.963 |

Finally, the effect of load modeling on the transformer, line and total system losses was evaluated for three load models: constant impedance, constant current and constant power loads. Among the three load types, simulation results indicate that the transformer, line and total system loss consumptions are the highest for constant impedance loads. The loss consumptions for the algebraic combination of ZIP loads are expected to fall into that area between constant power and constant impedance loads. With those figures, it is clear that load models have a substantial effect on system performance.

Reactive power compensation and voltage control via capacitor placement/control in distribution systems are important tasks, which continue to receive interest in the power industry. The purpose of real-time control of capacitors is to achieve the best possible reactive power compensation, voltage control and system capacity release under load variations. In accordance with the present invention, the task of capacitor placement in conjunction with real-time operation and control is undertaken. The problem is decoupled into two subproblems, capacitor placement and capacitor control. A suitable solution algorithm for placing capacitors and determining their real-time control schemes for general, real, unbalanced distribution systems is herein described. A fast pseudo-gradient-type mechanism for deriving a capacitor control setting is incorporated into the solution algorithms in order to meet the need for efficient implementation in real-time environments. A quadratic-integer, programming-based approach can determine the number, locations and sizing of capacitors to be placed in the distribution systems. The subproblem of determining a capacitor control setting under nonlinear load variations is formulated as another quadratic integer problem and is efficiently solved.

Capacitors and voltage regulators are widely installed in distribution systems for reactive power compensation, in order to improve the efficiency of power distribution via real power and energy reduction, to improve service quality via voltage regulation and to achieve deferral of construction, if possible, via system capacity release. The extent of these benefits depends greatly upon how the capacitors are strategically placed and controlled in a system, under any possible loading conditions.

In the past, considerable efforts have been devoted to the subject of capacitor and voltage regulator placement, as well as control problems. A number of methods have been proposed in this regard, and are broadly classified into two distinguishing classes: those basically based upon exact power flows by iterative computation, and those relying on approximate power flows by direct computation. Despite previous efforts, there is still a lack of suitable methods for capacitor placement and control in large-scale distribution systems.

In accordance with this invention, the problems of capacitor/voltage regulator placement and control in unbalanced distribution systems are formulated as a combinatorial optimization problem. This formulation is motivated by the result of explicit loss formula, where the objective function can be simply represented as a quadratic function of control variables. Fast, quadratic-integer, programming-based solution algorithms have been devised for capacitor placement and real-time control in general distribution systems. The reason for proposing quadratic integer programming is because these types of solution algorithms are capable of dealing with the combinatorial nature of the capacitor placement and control problems within reasonable, polynomial time; exhaustive search techniques are computationally prohibitive for such problems.

Fast, quadratic-integer, programming-based solution algorithms are devised to efficiently identify the number, locations, types and sizes of capacitors, as well as the number, locations and tap settings of voltage regulators to be placed in the system and subsequently controlled, so as to adapt to the changing loading conditions. The suitability of these algorithms for real-time, capacitor control is justified by their potential for very fast implementation. To cope with large-scale networks, a network flow programming technique is incorporated into the solution algorithms as a basic data structure. One of the distinctive features associated with the solution algorithms is their numerically fast computational ability.

The capacitor placement and control problems can be solved by decoupling the time-varying control variables with the time-invariant location variables. Under load variations, the time-varying, capacitor control settings are determined separately, since the number, locations and sizes are time-invariant and, thus, independent of load changes. The aim for capacitor control is to switch capacitors to higher/lower levels as needed for best possible reactive compensation, as load-reactive components change according to load time variations.

The capacitor placement consists of determining the number, locations and sizing of capacitors to be placed in a distribution system. The task is accomplished by an efficient search technique. Capacitor control schemes are determined by a fast, quadratic-integer, programming-based solution methodology. The net savings due to energy loss reduction can be maximized as a result of the optimal placement and control schemes.

To expedite the design of an efficient solution algorithm for the capacitor placement and control problems, a method for power flow and loss calculation is presented. In this method, total real power/energy loss of a general, unbalanced, distribution system can be explicitly expressed as a function of network data and the capacitor control setting vector. In the following, $P_{Loss}/E_{Loss}$ stands for the total power/energy loss consumed by nominal loads in a distribution feeder. The net real power/energy loss reduction is represented by a simple quadratic function of the capacitor control setting vector:

$$\Delta P_{Loss}/\Delta E_{Loss} = -u^T A u + 2bu,$$

where u is a vector determining the capacitor control scheme. Both A and b can be constructed by system and network data. The expressions of A and b for power loss take different forms from those utilized for energy loss.

Unsurprisingly, the loss function for an unbalanced distribution system is not expressed as a function of the voltage regulator tap setting, since a regulator's effect on the loss function is negligible. However, the voltages are influenced by the regulator tap setting. In the above formula, the capacitor control variable u determines the amount of loss reduction after capacitor placement/control. For most unbalanced distribution systems, the above loss function has a concavity property with respect to u, which will lead to a faster derivation of the discrete capacitor control setting.

Therefore, for a given network topology, system and network data, a basic portion of system loss is invariant of capacitor control setting, and a variable portion of system loss is dependent upon the overall placement and control scheme. With respect to a specific u, system power loss reduction can be calculated simply by the quadratic formula. Given a suitable, objective function, e.g., either power or energy loss for minimization, the problem is reduced to a quadratic-integer program. An integer variable is found to optimally determine the number, locations, types, sizes and control settings of capacitors to be placed in the system.

Explicit energy and power loss formulae are capable of efficient computation, and can be used to quickly determine optimal capacitor placement and control schemes. For the development of explicit power flow and loss formulae, theoretical concepts for distribution networks are required. The set of nodes in a distribution system is denoted as N. $N_c$ stands for the set of capacitor locations. The path from the k-th node in N to the substation is represented by $P_k$. $P_{j,k}$ stands for the common path between a pair of arbitrary nodes, j and k, in N. $L_k$ represents the set of nodes in $P_k$. $L_{j,k} = L_j \cap L_k$ is defined as the set of common nodes in both paths $P_k$ and $P_j$. Finally, $C_k = \{l | l \in L_l\}$ is a collection of the children nodes of k. k is referred to as the parent node of the nodes in this set. Finally, $N_t$ is the set of nodes in the secondary side of transformers.

To develop the explicit line flow formula, the conventional relationship between line currents and voltages is required at both ends of the line:

$$\begin{bmatrix} I^p \\ I^s \end{bmatrix} = \begin{bmatrix} Y_{pp} & Y_{ps} \\ Y_{sp} & Y_{ss} \end{bmatrix} \begin{bmatrix} v_p \\ v_s \end{bmatrix},$$

where $Y_{pp}$, $Y_{ps}$, $Y_{sp}$ and $Y_{ss}$ have different expressions for various types of transformer connections. Due to the nature of these matrices, $s_p$ can be neglected in subsequent loss calculations.

The line flow at the primary side can be directly related to that of the secondary side according to:

$$I^p = S_p I^s + s^p = S_p I^s.$$

If a line section contains a transformer or line charging, $S_p = Y_{ps} Y^+_{ss}$ and $S^p = (Y_{pp} - Y_{ps} Y^+_{ss} Y_{sp}) u_p$. $Y^+_{ss}$ represents the pseudo-inverse of $Y_{ss}$ satisfying $Y^+_{ss} Y_{ss} Y^+_{ss} = Y^+_{ss}$ and $Y_{ss} Y^+_{ss} Y_{ss} = Y_{ss}$. If a line segment contains no transformer or has no line charging, $S_p$ is an identity matrix and $s_p = 0$.

Line flow at both primary and secondary sides can be integrated into a form as follows:

$$I_k = \sum_{l \in N_k} T_{k,l} J_l + j \sum_{p \in N_k \cap N_c} T_{k,p} W u_p,$$

where $T_{k,l} = S_k \ldots S_l$ for line flow at the primary side, and $S_k$ is set to an identity matrix for computing those at the secondary side.

$J_l$ is the load current at bus l, expressed for ZIP load model, as follows:

$$J_l = \begin{bmatrix} c_{l1}G_l^a v_l^a + c_{l2}J_l^a + c_{l3}\dfrac{P_l^a}{(v_l^a)^*} \\ c_{l1}G_l^b v_l^b + c_{l2}J_l^b \angle -\dfrac{2\pi}{3} + c_{l3}\dfrac{P_l^b}{(v_l^b)^*} \\ c_{l1}G_l^c v_l^c + c_{l2}J_l^c \angle -\dfrac{2\pi}{3} + c_{l3}\dfrac{P_l^c}{(v_l^c)^*} \end{bmatrix} -$$

$$j \begin{bmatrix} c_{l1}B_l^a v_l^a + c_{l2}K_l^a + c_{l3}\dfrac{Q_l^a}{(v_l^a)^*} \\ c_{l1}B_l^b v_l^b + c_{l2}K_l^b \angle -\dfrac{2\pi}{3} + c_{l3}\dfrac{Q_l^b}{(v_l^b)^*} \\ c_{l1}B_l^c v_l^c + c_{l2}K_l^c \angle -\dfrac{2\pi}{3} + c_{l3}\dfrac{Q_l^c}{(v_l^c)^*} \end{bmatrix}$$

where $c_{l1}$, $c_{l2}$ and $c_{l3}$ are model coefficients lying in the interval [0,1], and $c_{l1}+c_{l2}+c_{l3}=1$ for all l. If any phase of the load bus l does not exist, the corresponding elements of $J_l$ contain zero entries.

The basic real power loss $P_{LO}$ is given by the standard formula:

$$P_{LO} = \sum_{k \in N/N_t} I^*_k R_k I_k + \sum_{m \in N_t} [(I_m^p)^* v_m^p + (I_m^s)^* v_m^s]$$

which can be explicitly expressed in terms of system and load data. By virtue of the line flow formula, the real power loss is expressed as follows:

$$P_{LO} = \sum_{k \in N/N_t} I^*_k R_k I_k + \sum_{m \in N_t} (I_m^s)^* R_m I_m^s$$

$$= \sum_{k \in N} \left\{ \sum_{l \in C_k} T_{k,l} J_l \right\}^* R_k \left\{ \sum_{l \in C_k} T_{k,l} J_l \right\}$$

$R_m$ is the real part of an equivalent transformer transmission impedance, given by:

$$Z_m = S_p' Z_{pp} S_p + Z_{ss} + S_p' Z_{ps} + Z_{sp} S_p \cdot \begin{bmatrix} Z_{pp} & Z_{ps} \\ Z_{sp} & Z_{ss} \end{bmatrix} = \begin{bmatrix} Y_{pp} & Y_{ps} \\ Y_{sp} & Y_{ss} \end{bmatrix}^+$$

where p and s refer to the primary and secondary sides of each line section. $R_k$ is the real part of the network transmission impedance for the line connecting k to its preceding node:

$$R_k = \begin{bmatrix} r_k^{aa} & r_k^{ab} & r_k^{ac} \\ r_k^{ba} & r_k^{bb} & r_k^{bc} \\ r_k^{ca} & r_k^{cb} & r_k^{cc} \end{bmatrix}.$$

If any phase of the line section does not exist, the corresponding row and column in this matrix contain all zero entries.

The real power loss of a distribution system consumed by normal loads is expressed as a quadratic function of the capacitor control setting vector u:

$$P_{Loss} = P_{LO} + u^T A^O u - 2(b^O)^T u,$$

where $P_{LO}$ is the base case real power loss.

$$u = [u_1^a \ u_1^b \ u_1^c \ \ldots \ u_{n_c}^a \ u_{n_c}^b \ u_{n_c}^c]^T$$

is a control vector. Closed-form expressions for $P_{LO}$, A and b are given next.

In addition, if both loads and capacitors are modeled as constant current injections to the system, the (k,l)-th block entry of $A^O$ is a 3×3 matrix given by:

$$A_{k,l}^0 = \sum_{m \in L_{k,l}} W^* T^*_{k,m} R_m T_{l,m} W$$

and $$b_l^0 = -\text{imag}\left\{ W^* \sum_{k \in L_l} T^*_{l,k} R_k \sum_{m \in C_k} T_{k,m} J_m \right\},$$

where $$W = \text{diag}\left\{ 1, e^{j\frac{2\pi}{3}}, e^{-j\frac{2\pi}{3}} \right\}.$$

In an analogous manner, the energy loss formula can be derived by taking into account several load levels and their associated time durations. $N_T=\{1,2,\ldots,L\}$ is a discrete set of load levels. The real power loss at load level i can be expressed in a compact form as:

$$P_{Loss}^i = P_{LO}^i + (u^i)^T A^i u^i - 2(b^i)^T u^i,$$

where all variables are associated with the i-th load level, $i \in N_T$. The load variation factor is denoted as $\tau_l^i$. The line flow is modified as $$I_k^i = \Sigma_{l \in N_k} \tau_l^i T_{k,l} J_l.$$

If loads are uniformly varying, with a variation factor $T^i$ for the i-th load level, $$I_k^i = \tau^i j$$

In the loss formula, the (k,l)-th block entry of $A^i$ is a 3×3 matrix, $A^i = A^O$.

$$b_l^i = -\text{imag}\{W^* \Sigma_{k \in L_l} T_{l,k}^* R_k \Sigma_{m \in N_k} \tau^i T_{k,m} J_m\}$$

If loads are uniformly varying, with a variation factor $\tau^i$ for the i-th load level, $$b_l^i = \tau^i b_l^O.$$

The energy loss at a certain time period, $T1+T2+\ldots+Tl$, is a summation of those over L time periods:

$$E_{Loss} = \sum_{i=1}^{L} T^i P_{Loss}^i.$$

Thus, the use of power loss formula gives the energy loss formula as a compact form:

$$E_{Loss} = E_O + u^T A u - 2bu.$$

In the above formula, the expressions for A and b are given differently, when either fixed or switched capacitor placement is considered.

For fixed capacitor placement, $u^i$ is independent of the load level i; it is simplified to u.

$$E_0 = \sum_{i=1}^{L} T^i P_0^i, A = \sum_{i=1}^{L} T^i A^i \text{ and } b = \sum_{i=1}^{L} T^i b^i.$$

For switched capacitor placement, the control variable $u^i$ is a function of the time variation load factor, $\tau^i$. An alternative variable, u, is introduced where $u=[u^1, u^2, \ldots, u^L]^T$. Correspondingly, A is represented by $diag\{A^1, A^2, \ldots, A^L\}$, and in an aggregate form, b is given by $b=diag\{b^1, b^2, \ldots, b^L\}$.

Finally, the voltage at node k and load level i is determined by $$(v_k^i)^{new} = v_k^i + j \sum_{p} \sum_{l \in L_k} T^*_{l,k} Z_l \sum_{p \in N_l \cap N_e} T_{l,p} W u_p$$

$$v_k^i = v_0^i + 2 \sum_{i \in L_k, l \in N_v} T^*_{l,k} W \tau_l - \sum_{l \in L_k} T^*_{l,k} Z_l \sum_{m \in N_l} \tau_m^i T_{l,m} J_m,$$

where $v^i_O$ is the voltage vector at source and load level i.

One advantage of the loss and power flow formula is attributed to the capability for the efficient, accurate computation of power/energy losses and voltage profile for a distribution system, without a recourse to repeated power flows. Another advantage of the loss formula may be attributed to the explicit representation of the power and energy losses in terms of the capacitor control setting.

Thus, one may then take advantage of the resulting formula to solve the capacitor control setting without a large number of power flow computations, where the loss formula directly applies to the capacitor placement and control in distribution systems.

Efficient solution algorithms regarding a formulation for both (1) optimal placement and control of capacitors, and (2) constrained optimal placement and control of capacitors and regulators, are mainly intended for quick identification of a set of capacitor locations and capacitor control settings. One of the key features of the proposed algorithms is that they can handle large-scale, distribution networks with a reasonable amount of computation, and avoiding the unnecessary use of many repetitive runs of computationally-comprehensive power flows for large-scale, unbalanced systems.

The proposed algorithms share the common feature of constructing the necessary $A \in R^{3n_c \times 3n_c}$ matrix and $b \in R^{3n_c}$ and vector in the quadratic-integer programming formulation through network flow programming. Network flow programming has an advantage of coping with the large, complex networks.

Because the objective function does not depend on the regulator tap setting, the capacitor and regulator placement/control problems can be decoupled into two subproblems, solved separately. The subproblem solutions can be integrated into a complete solution.

The solution algorithms given below for determination of both capacitor number, locations and sizes, as well as their corresponding, real-time control setting for each load level, consist of three basic elements:

(1) For each load level according to network data and network flow programming.

(2) Determine the set $N_c$ from N, and find the capacitor sizes. Solve for the continuous capacitor control setting vector $u^i = (A^i)^{-1} b^i$.

(3) Discretize $u^i$, to satisfy optimality.

This class of solution algorithms takes full advantage of network flow pointers given by network flow programming techniques. In this study, three necessary network flow pointers composed of n-dimensional vectors, the order of a node o(.) the degree d(.) and the preceding node p(.) of o(.) are constructed for the convenience of computation for A and b. These network flow pointers provide network connectivity information (such as information about the location of a node in the network), and are primarily used to automatically trace the unique path from an arbitrary node to the substation, as well as a common path of two nodes to the substation in the network for the computation of A and b. Network flow programming is a convenient, automated tool, and cannot be avoided when the network is sufficiently large.

On the other hand, with the availability of network flow pointers, A and b are then easily constructed by using line and load data. Given a set of possible locations, with the total number $n_c$ of capacitor buses, network flow pointers and system data are acquired to compute A and b, without the difficulty of locating the unique path from the substation to the capacitor node and the common path of the two paths connecting the substation to a pair of capacitor nodes.

In the second step of the solution algorithms, the capacitor number, locations and sizes are determined by the use of a quadratic, programming-based solution methodology that can identify the most suitable set of capacitor locations in order to minimize a performance measure.

In the third step of the above procedure, the resulting control setting of a capacitor at a load level is continuous, and is rounded upward or downward to the nearest capacitor banks. An additional step is necessary for forming the quadratic-integer, programming solution to find a discrete, capacitor control setting vector. This step is achieved by some well-devised techniques that yield solutions with justifiable optimality.

For well-conditioned distribution networks, transformers and voltage regulators must be properly placed; voltage violations do not usually occur in most practical systems. The task of capacitor placement and control is now primarily to achieve reactive power compensation and loss minimization, as well as to regulate voltage for a desirable profile. It is well known that transformers and voltage regulators play a more predominant role in adjusting voltage magnitudes than do capacitors. Thus, when only capacitor placement and control problems are considered, voltage constraints may be dropped. Furthermore, when voltage constraints are satisfied before capacitor placement, they ought to be satisfied after capacitor placement, since properly coordinated capacitors can better regulate a system's voltage profile. In this regard, a solution algorithm is disclosed herein for general capacitor placement and control problems, without constraints on voltage limits. For the convenience of notation, $U=\{0, u_{c1}, u_{c2}, \ldots, U_{cn_s}\}$ is given to represent the set of standard capacitor taps.

Algorithm 1

Stage I:

Determination of capacitor number, locations and sizes.

Step 1:

Initialize $n_c = 0$ as the number of capacitors to be placed. Choose a peak load level for each load demand at each bus. Let $N_c = \emptyset$.

Step 2:

For $k=1, 2, \ldots, n$, n is the total number of buses in the distribution systems, have $N_c \cup k$ and form the k-dependent $3*n_c \times 3*n_c$ matrix $A^O$ and vector $b^O$ for $N_c \cup k$.

Step 3:

Calculate $\|(b^O)^T (A^O)^{-1} b^O\|$ for all $k=1, 2 \ldots, n$. Choose an index $k_{opt}$, which results in the largest norm as a capacitor bus. Set $n_c \leftarrow n_c+1$ and $N_c \leftarrow N_c \cup k_{opt}$.

Step 4:
Repeat Steps 2–3 until the norm of the last three indices of $(A^O)^{-1}b^O$ is less than a threshold value.

Step 5:
Output the intermediate results. $N_c$ contains the number and locations of capacitor buses, and ceiling $\{(A^O)^{-1}b^O\}$ contains the capacitor sizes.

Remark 1:
The formation of $A^O$ and $b^O$ in Step 2 takes the most computational effort in the solution algorithm. For efficient implementation, only the different entries of $A^O$ and $b^O$ are updated when the number of elements in $N_c$ is larger than 1. As a result, this makes the solution algorithm effective for large-scale distribution systems.

Remark 2:
The sizing vector can also be determined by modifying the procedure to follow, while setting the test load level as a peak load level for each bus. The resulting capacitor control setting $u^O$ is the sizing vector.

Remark 3:
The capacitor placement solution is decoupled from the capacitor control solution. This two-staged methodology has the advantage of separate implementation for the most effective solutions. As a result, the capacitor placement problem can be implemented either offline or online, while the capacitor control problem is determined online.

Stage II:
Determination of capacitor control settings under varying loading conditions.

Step 1:
Given the set $N_c$ and a load level index i, build $A^i$ and $b^i$ according to network connectivity and load data through network flow programming.

Step 2:
Solve for the capacitor control setting vector $$u = (A^i)^{-1}\left( b^i - \frac{K_c}{2K_E} b_c \right).$$

Step 3:
Round u to the nearest feasible capacitor control setting.

Step 4:
Test for an optimality condition: calculate the gradient vector $g = 2K_E A^i u - 2K_E b^i - K_c b_c$. If $g \geq 0$, stop. Continue to the next step, otherwise.

Step 5:
Find the index $k = \{l|\min_l g_l\}$, and set the k-th component $u^i_k$ to the next higher bank. Go to Step 4.

Step 6:
Repeat Steps 1–5 for the next load level.

The output of this solution algorithm gives an optimal capacitor number, locations, sizes, types and control settings. The capacitor number, locations and sizes are independent of the load level i, and are determined by Stage I. The capacitor control setting vector $u^i$, however, is dependent on the load level i; it is determined by Stage II. The final solution u determines the optimal number, locations, sizes and control settings of switched capacitors to be placed in the system.

Finally, due to the existence of most inductive loads in general distribution systems, the fact that $$b^i \leq \frac{K_c}{2K_E} b_c$$

is often true. From this, one can draw the conclusion that $u^i \geq 0$. In the construction of $A^i$ and $b^i$, the solution algorithms fully take advantage of network flow functions to effectively locate the required elements in the network and system data. Thus, the program can be used to solve the capacitor placement problem for very large networks with complex radial connections.

Using constrained algorithms, capacitor and regulator placement/control problems can be decoupled into two interrelated problems. The main task of regulator placement and control is to guarantee no voltage-limit violations. The main task of capacitor placement and control is to achieve maximum loss reduction and minimum investment cost. The proposed, constrained algorithm is similar to the unconstrained algorithm, but it differs in additional steps of feasibility enforcement on no violation in the upper and lower voltage limits. The number, locations and tap settings of voltage regulators must be adjusted so that the voltage at each bus and each phase falls within the lower and upper limits. To determine feasibility, voltage magnitude is ascertained to determine whether each bus falls within the lower or upper limits. If there is no constraint violation, u is output; otherwise, calculations proceed normally.

According to this basic procedure, solution algorithms are devised to solve the problem of joint regulator and switched capacitor placement/control. The following algorithm is used to determine capacitor control settings, as well as regulator number, locations and tap settings, given that the capacitor number, locations and sizes are predetermined by Stage I of Algorithm 1.

Algorithm 2
Step 1:
If the voltage magnitudes are not within certain, present limits, adjust the voltage regulator number, locations and tap settings, so that voltage falls within the lower and upper limits.

Step 2:
Determine the capacitor number, locations and sizes of Stage I of Algorithm 1 to get $N_c$.

Step 3:
Given the set $N_c$, and a load level index i, build $A^i$ and $b^i$ by using network data and network flow programming.

Step 4:
Solve for the capacitor control setting vector for the i-th load level, using the equation $$u^i = (A^i)^{-1}\left( b^i - \frac{K_c \tau_i}{2K_E T_i \Sigma_i \tau_i} b_c \right).$$

Step 5:
For each load level i, round $u^i$ to the nearest capacitor bank sizes.

Step 6:
Test for optimality condition: calculate $$g^i = 2A^i u^i - 2b^i + \frac{K_c \tau_i}{2K_E T_i \Sigma_i \tau_i} b_c$$

for each load level i. If $g \geq 0$, stop. Otherwise, continue.

Step 7:
Find the index with which $k = \{|\min_l g^i_l\}$, and set $u^i_k$ to the next higher bank size. Go to Step 4.

The output of the above solution algorithm is the capacitor control setting $u^i$ at each load level. $u^i$'s determine the capacitor control settings and, thus, the switching control schemes. The k-th component of the sizing vector is determined by $$u_k^o = \max_{i=1}^{n_i} u_k^i, k = 1, \ldots, n_c.$$

Due to the nature of inductive load demands, in general, $$b^j \geq \frac{K_c \tau_i}{2K_E T_i \Sigma_i \tau_i} b_c,$$

and, thus, $u^i \geq 0$.

The above two solution algorithms are intended for those problems formulated herein with quadratic objective function and discrete variables, where the physical reality of discrete capacitor banks and the cost of capacitors are naturally taken into consideration.

BIBLIOGRAPHY

[1] Baldick, R., and F. F. Wu. 1990. "Efficient integer Optimization Algorithms for Optimal Coordination of Capacitors and Regulators". *IEEE Trans. on Power Systems*. Vol. 5, No. 3, August:805–812.

[2] Baran, M. E., and F. F. Wu. 1939. "Network Reconfiguration in Distribution Systems for Loss Reduction and Load Balancing". *IEEE Trans. on Power Delivery*. Vol. 4, No. 2, April:1401–1407.

[3] Baran, M. E. and F. F. Wu. 1989. "Optimal Capacitor Placement on Radial Distribution Systems". *IEEE Trans. on Power Delivery*. Vol. 4, No. 1, January:725–734.

[4] Bishop, M. T. and Lee, R. E. 1986. "Distribution System Line Loss Reduction Through Enhanced Capacitor Location Technique". *IEEE Trans. on Power Delivery*. Vol. 1, No. 2, April:190–197.

[5] Broadwater, R. P., Kahn, A. H., Shaalan, H. E., and Lee, R. E. 1993. "Time Varying Load Analysis to Reduce Distribution Losses Through Reconfiguration". *IEEE Trans. on Power Delivery*. Vol. 8, No. 1, January:294–300.

[6] Chen, C. S. and Cho, M. Y. 1993. "Energy Loss Reduction by Critical Switches". *IEEE Trans. on Power Delivery*. Vol. 8, No. 3, July:1246–1253.

[7] T. H. Chen, M. S. Chen, K. J. Hwang, P. Kotas and E. A. Chebi. 1991. "Distribution System Power Flow Analysis-a Rigid Approach". *IEEE Trans. on Power Delivery*. Vol. 6, No. 3, July:1146–1152.

[8] T. H. Chen. 1990. "Generalized Distribution Analysis System", Ph.D. dissertation, The University of Arlington, Arlington, Tex.

[9] Hsiao-Dong Chiang, Jin-Cheng Wang, O. Cockings, and H. D. Shin. 1990. "Optimal Capacitor Placements In Distribution Systems: Part I: A New Formulation and Overall Problem". *IEEE Trans. on Power Delivery*. Vol. 5, No. 2, April:634–642.

[10] S. Civanlar, J. J. Grangier. 1985. "Volt/Var Control on Distribution Systems with Lateral Branches Using Shunt Capacitors and Voltage Regulators:Part I, Part II, Part III". *IEEE Trans. on Power Apparatus and Systems*. Vol. 104, November:3278–3297.

[11] A. A. El-Kib, J. J. Grainger, K. N. Clinard, L. J. Gale. 1985. "Placement of Fixed and/or Non-Simultaneously Switched Capacitors on Unbalanced Three-Phase Feeders involving Laterals". *IEEE Trans. on Power Apparatus and Systems*. Vol. 104, November:3298–3305.

[12] S. K. Goswami and S. K. Basu. 1992. "A New Algorithm for the Reconfiguration of Distribution Feeders". *IEEE Trans. on Power Delivery*. Vol. 7, No. 3, July:1484–1491.

[13] J. J. Grainger, and S. H. Lee. 1982. "Capacitor Release by the Shunt Capacitor Placement on Distribution System Feeders: A New Voltage Dependent Model". *IEEE Trans. on Power Apparatus and Systems*. Vol. 101, May:1236–1244.

[14] J. J. Grainger, and S. H. Lee, A. A. El-Kib. 1982. "Design of Real-time Switching Control Scheme for Capacitive Compensation of Distribution Feeders". *IEEE Trans. on Power Apparatus and Systems*. Vol. 101, August:2420–2428.

[15] K. H. Jung, H. Trim and Y. Ko. 1993. "Network Reconfiguration Algorithm for Automated Distribution Systems Based on Artificial Intelligent Approach". Vol. 8, No. 4, October:1933–1941.

[16] H. C. Kuo and Y. Y. Hsu. 1993. "Distribution System Load Estimation and Service Restoration Using a Fuzzy Set Approach". *IEEE Trans. on Power Delivery*. Vol. 8, No. 4, October:1950–1957.

[17] R. E. Lee and C. L. Brooks. 1988. "A Method and its Application to Evaluate Automated Distribution Control", *IEEE Trans. on Power Delivery*. Vol. 3, No. 3, July:1232–1240.

[18] S. H. Lee and J. J. Grainger. 1981. "Optimum Placement of Fixed and Switched Capacitors on Primary Distribution Feeders". *IEEE Trans. on Power Apparatus and Systems*. Vol. 100, March:345–352.

[19] G. X. Luo and A. Semlyen. 1990. "Efficient Power Flow for Large Weakly Meshed Networks". *IEEE Trans. on Power Systems*. Vol. 5, No. 4, November:1309–1316.

[20] J. Qiu and S. M. Shahidehpour. 1987. "A New Approach For Minimizing Power Losses and Improving Voltage Profile". *IEEE Trans. on Power Systems*. Vol. PWRS-2, No. 2, May:287–295.

[21] G. P. Roelofs. 1989. "Effects of Load Modelling on the Behaviour of Power Systems". *International Journal of Electrical Power & Energy Systems*. Vol. 11, No. 4, October:289–292.

[22] D. W. Ross, J. Patton, A. I. Cohen and M. Carson. 1981. "New Methods for Evaluating Distribution Automation and Control (DAC) System Benefits". *IEEE Trans. on Power Apparatus and Systems*. Vol. 100, No. 6, June:2978–2986.

[23] M. M. A. Salama, E. A. A. Mansour, A. Y. Chikhani and R. Hackam. 1985. "Control of Reactive Power in Distribution Systems with an End Load and Varying Load Condition". *IEEE Trans. on Power Apparatus and Systems*. Vol. 104, pp. 941–947.

[24] M. M. A. Salama and A. Y. Chikhani. "A Simplified Network Approach to the VAR Control Problem for Radial Distribution Systems". *IEEE PES* 1992 *Summer Power Meeting, Seattle, Wash.*

[25] D. Shirmohammadi, H. W. Hong, A. Semlyen and G. X. Luo. 198. "A Compensation-based Power Flow Method for Weakly Meshed Distribution and Transmission Networks". *IEEE Trans. on Power Systems*. Vol. 3, No. 2, May:753–762.

[26] D. Shirmohammadi, H. W. Hong. 1989. "Reconfiguration of Electric Distribution Networks for Resistive Line Losses Reduction". *IEEE Trans. on Power Delivery*. Vol. 41, No. 2, April:1492–1498.

[27] T. Taylor and D. Lubkeman. 1990. "Implementation of Heuristic Search Strategies for Distribution Feeder Reconfiguration". *IEEE Trans. on Power Delivery*. Vol. 5, No. 1, January:239–246.

[28] Jin-Cheng Wang, Hsiao-Dong Chiang, Gary Darling. "Capacitor Placement and Real Time Control in Large-Scale Unbalanced Distribution Systems: Numerical Studies". Submitted to 95 *IEEE Winter Power Meeting, New York*.

Figure 2:
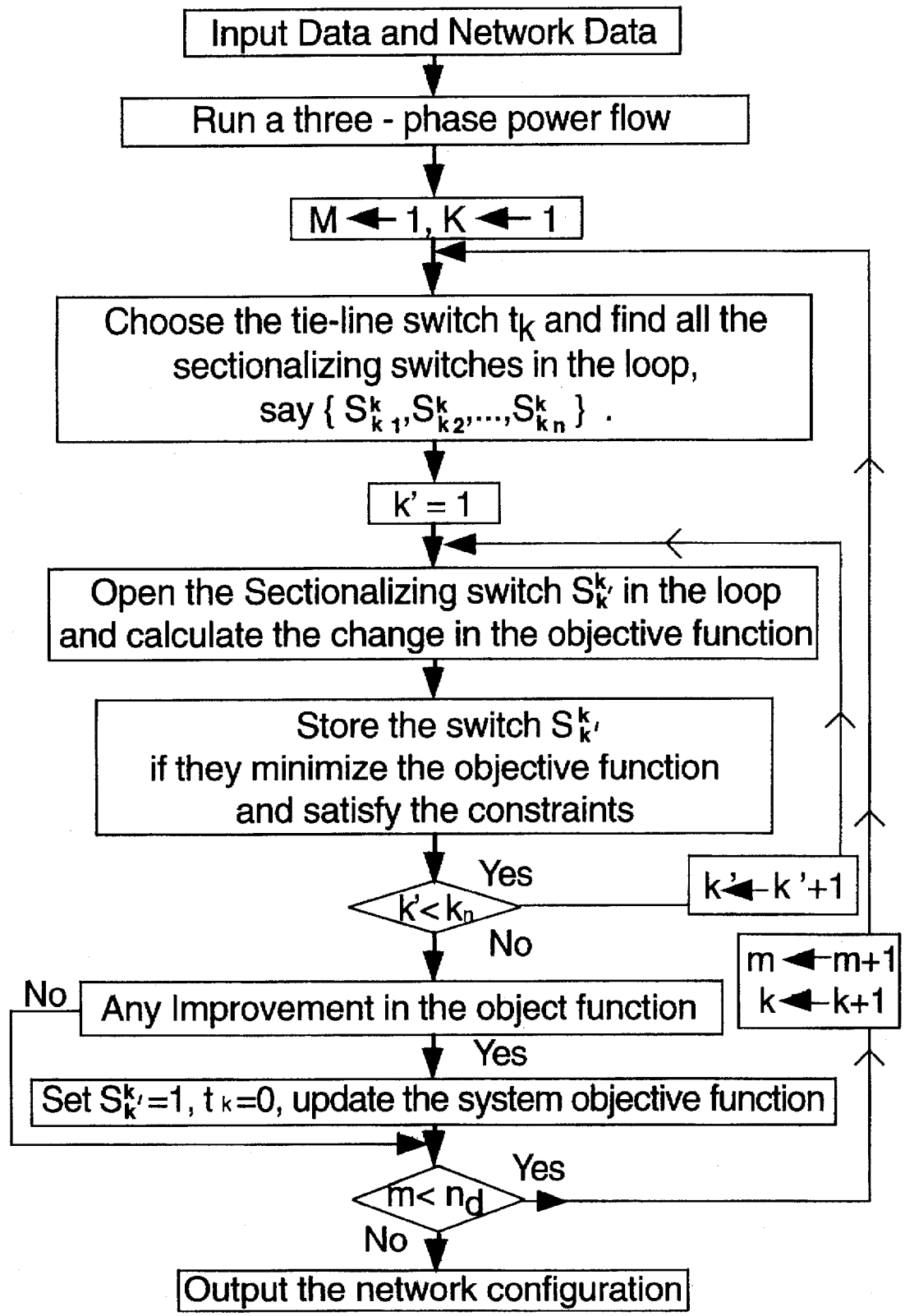
FIG. 2 is a flowchart of a specific algorithm for performing network reconfiguration, in accordance with the present invention.

Once the loss, voltage and line flow formulae are derived and solved for the analyzed, unbalanced, power-distribution network, the system can be reconfigured, and components (e.g., capacitors, regulators and switches) can be placed in accordance with such solution(s), as shown in FIG. 2.

Referring now to FIG. 3, there is shown a schematic representation, with appropriately annotated components, of a distribution control center which performs various functions in accordance with the invention, including those functions described hereinbelow with respect to FIGS. 2 and 4.

Referring now to FIG. 2, there is shown a flowchart 10 of the process of the present invention. Data representing each feature of the power-distribution system to be controlled is first entered into a computer database, step 12. A three-phase power flow analysis is performed, step 14. Two loop control variables M and K are initialized to 1 (unity), step 16. Using one of the methods described in detail hereinabove, a k-th tie-line switch $t_k$ is chosen and all n sectionalizing switches in the loop are identified, step 18. An additional variable k' is next initialized to 1 (unity), step 20. The sectionalizing switch is next opened, and any change in the objective function is calculated, step 22. The sectionalizing switch is stored if it minimizes the objective function while other constraints are also satisfied, step 24. Decision block 26 determines whether k' is less than $k_n$. If so, control variable k' is incremented, step 28, and control is transferred to step 22. If not, a check is made for improvement in the object function, step 30. If improvement in the object function is observed, then the chosen sectionalizing switch is assigned a value of 1 and $t_k$ is assigned a value of 0, step 32. Control is transferred to decision block 34. If, however, no improvement in the object function is observed, step 30, then control is transferred directly to decision block 34. If all sectionalizing switches have not yet been incremented, step 34, then variables m and k are incremented, step 36, and control is transferred again to step 18. If all n sectionalizing switches have been processed (i.e., m>=n), step 34, then the optimized network is reconfigured, step 38.

Figure 4:
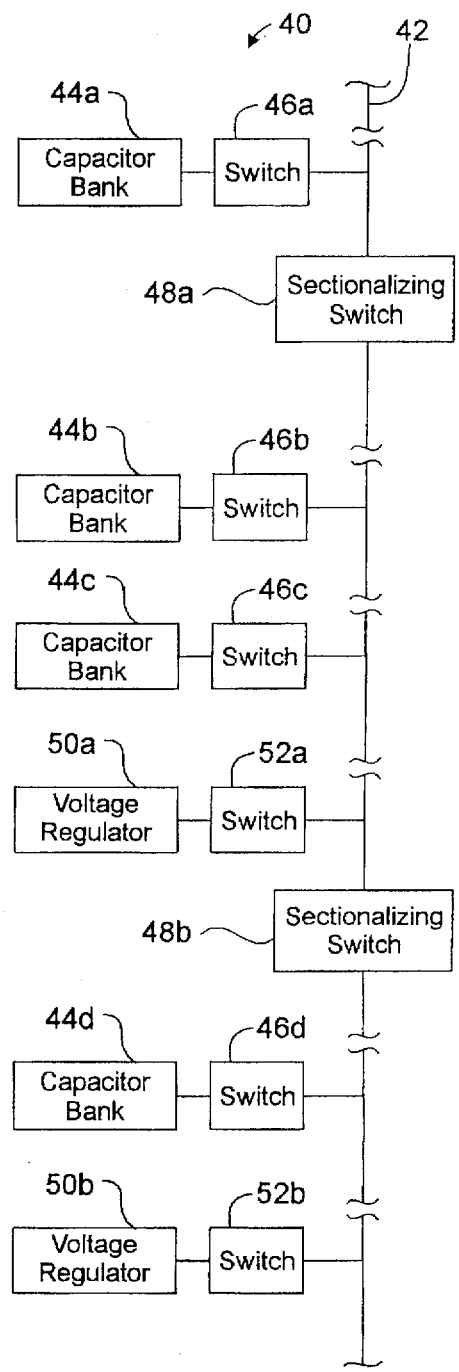
FIG. 4 is a schematic diagram of a portion of an electrical distribution system showing system reconfiguration and control devices.

Referring now to FIG. 4, there is shown a schematic diagram 40 of a portion of an electrical distribution system. A distribution line 42 represents any portion of a larger electrical distribution network (not shown). The control functions of the present invention involve reconfiguration of the electrical distribution network in a variety of ways. First, capacitor banks 44a, 44b, 44c, 44d may be connected to distribution 42 by means of switches 46a, 46b, 46c, 46d, respectively. In addition, other voltage regulators 50a, 50b; as are well known to those in the art, may also be selectively connected to the line by means of switches 52a, 52b respectively. A final method for providing network reconfiguration is by the use of sectionalizing switches 48a, 48b. Such switches are also well known to those skilled in the art. Sectionalizing switches 48a, 48b; as well as the connecting switches 46 and 52 are all assumed to be remotely controlled. Remote control of such switches is well known in the art and forms no part of the instant invention. Switches 46, 48, 52 are responsive in essentially real time to the results of the network flow analysis techniques of the present invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A closed-form method for controlling an unbalanced, power-distribution network, comprising:
    a) deriving a formula, including a fundamental, explicit loss formula for a predetermined power-distribution network;
    b) applying network flow programming techniques, incorporating said formula, directly to said power-distribution network in order to determine control steps necessary to achieve optimal, steady state therefor;
    c) estimating the effect of said control steps on said power-distribution network prior to application thereof; and
    d) performing said control steps on said power-distribution network in real time so as to control operation thereof.

2. The closed-form method for controlling an unbalanced, power-distribution network in accordance with claim 1, wherein performing said control steps comprises reconfiguring said power-distribution network.

3. The closed-form method for controlling an unbalanced, power-distribution network in accordance with claim 1, wherein performing said control steps comprises placing a predetermined capacitor at a predetermined position in said power-distribution network, said placement and position of said capacitor being dependent upon a solution of said explicit loss formula.

4. The closed-form method for controlling an unbalanced, power-distribution network in accordance with claim 1, wherein said formula further comprises a voltage formula.

5. The closed-form method for controlling an unbalanced, power-distribution network in accordance with claim 4, wherein said formula further comprises a line flow formula.

6. The closed-form method for controlling an unbalanced, power-distribution network in accordance with claim 1, wherein said power distribution network comprises a plurality of nodes, branches and laterals.

7. The closed-form method for controlling an unbalanced, power-distribution network in accordance with claim 6, wherein said power-distribution network comprises a radial network structure.

8. The closed-form method for controlling an unbalanced, power-distribution network in accordance with claim 7, wherein said power-distribution network comprises multiphase loads.

9. The closed-form method for controlling an unbalanced, power-distribution network in accordance with claim 8, wherein said power-distribution network comprises multiphase shunt elements.

10. The closed-form method for controlling an unbalanced, power-distribution network in accordance with claim 9, wherein said power-distribution network comprises transformers.

11. A closed-form method for controlling an unbalanced, power-distribution network, comprising:
    a) deriving a plurality of formulae, including a fundamental, explicit loss formula, for a predetermined power-distribution network;
    b) applying network flow programming techniques, incorporating said formulae, directly to said power-distribution network in order to determine control steps necessary to achieve optimal, steady state therefor;
    c) estimating the effect of said control steps on said power-distribution network prior to application thereof; and
    d) performing said control steps on said power-distribution network in real time so as to control operation thereof.

12. The closed-form method for controlling an unbalanced, power-distribution network in accordance with claim 11, wherein said formulae further comprise:

a) a voltage formula; and b) a line flow formula.

13. The closed-form method for controlling an unbalanced, power-distribution network in accordance with claim 12, wherein performing said control steps comprises placing a predetermined capacitor at a predetermined position in said power-distribution network, said placement and position of said capacitor being dependent upon a solution of said explicit loss formula.

14. The closed-form method for controlling an unbalanced, power-distribution network in accordance with claim 12, wherein performing said control steps comprises reconfiguring said power-distribution network.

15. The closed-form method for controlling an unbalanced, power-distribution network in accordance with claim 13, wherein said power-distribution network comprises a plurality of nodes, branches and laterals.

16. The closed-form method for controlling an unbalanced, power-distribution network in accordance with claim 15, wherein said power-distribution network comprises a radial network structure.

17. The closed-form method for controlling an unbalanced, power-distribution network in accordance with claim 16, wherein said power distribution network comprises multiphase loads.

18. The closed-form method for controlling an unbalanced, power-distribution network in accordance with claim 17, wherein performing said control steps comprises placing a predetermined capacitor at a predetermined position in said power-distribution network, said placement and position of said capacitor being dependent upon a solution of said explicit loss formula.

* * * * *